United States Patent

[11] 3,575,007

[72] Inventor: Arnold Gunther, West Orange, N.J.
[21] Appl. No.: 716,188
[22] Filed: Mar. 26, 1968
[45] Patented: Apr. 13, 1971
[73] Assignee: Treadwell Corporation, New York, N.Y.

[54] ISOTHERMAL FRACTIONAL DISTILLATION OF MATERIALS OF DIFFERING VOLATILITIES
5 Claims, 4 Drawing Figs.

[52] U.S. Cl. ............................................. 62/26, 203/12, 203/26, 203/93, 203/94, 260/676, 23/178
[51] Int. Cl. ........................................... B01d 3/00, F25j 3/02
[50] Field of Search ......................... 203/26, 25, 94, 91, 12, 24, 96; 62/26; 202/158, 174; 260/676, 677; 23/178

[56] References Cited

UNITED STATES PATENTS

| | | | |
|---|---|---|---|
| 1,862,069 | 6/1932 | Subkow | 202/158 |
| 2,645,608 | 7/1953 | Linn et al. | 203/94 |
| 2,847,200 | 9/1958 | Ung | 202/158 |
| 2,999,795 | 9/1961 | Yagi et al. | 203/5 |
| 3,088,987 | 5/1963 | Irvine | 203/91 |
| 3,151,043 | 9/1964 | Beattle et al. | 202/158 |
| 3,260,058 | 7/1966 | Ray et al. | 62/26 |
| 3,298,932 | 1/1967 | Bauer | 203/26 |
| 3,414,484 | 12/1968 | Carson et al. | 203/26 |

FOREIGN PATENTS

| | | | |
|---|---|---|---|
| 918,119 | 9/1961 | Great Britain | 62/26 |
| 659,886 | 3/1963 | Canada | 62/26 |

Primary Examiner—Wilbur L. Bascomb, Jr.
Attorney—Robert Ames Norton

ABSTRACT: Fractional distillation, i.e., separation of materials of differing volatilities, is effected under substantially isothermal conditions as opposed to isobaric conditions in the ordinary fractional distillation column. Instead of maintaining substantially the same pressure in a column and varying the temperature in the different stages, as in the customary isobaric fractional distillation, the temperature is maintained substantially or relatively constant and vapors from the different stages are compressed and introduced into the next stage. In other words, there is relatively little change in temperature but a change in pressure from stage to stage. This results in more efficient distillation with much smaller increase in entropy in the system.

INVENTOR.
ARNOLD GUNTHER

3,575,007

ISOTHERMAL FRACTIONAL DISTILLATION OF MATERIALS OF DIFFERING VOLATILITIES

BACKGROUND OF THE INVENTION

Separation of materials of differing volatilities is customarily effected in fractional distillation processes using columns with plates dividing them into stages or with packed columns. The pressure in any of the stages or regions of such a column varies little except for small differences due to hydrostatic head and flow resistance through the column. This system may therefore be considered as isobaric in that there is little change in pressure but a significant change in temperature from one stage to another.

The efficiency of an isobaric fractional distillation system is relatively low because there is a large increase in entropy due to irreversible heat flows resulting from the different temperatures in the different zones or stages of a distillation column. Also, to obtain the desired separation many stages or plates in a column are required. This represents a considerable equipment cost.

SUMMARY OF THE INVENTION N

The present invention operates under a physical principle which will be referred to throughout the specification and claims as isothermal. In the present invention the temperature is maintained relatively constant throughout the column or may only change slightly or be slightly different in two separate operational zones of the column, namely a rectification zone and a stripping zone. Separation is effected by compressing vapors from one zone to the next. In other word, instead of the standard isobaric system the isothermal system has a substantially constant temperature and a variation of pressure from zone to zone or stage to stage instead of a substantially constant pressure and variation in temperature from zone to zone or stage to stage in the standard isobaric system. These separations will be sometimes referred to as fractional distillations.

An absolutely perfect isothermal operation in which there is no flow of sensible heat anywhere in the system is an ideal which can be approached very closely. In practice it may be desirable to deviate somewhat from a uniform column temperature for the purpose of reducing the number of stages for a separation or to provide a condensation temperature of the overhead vapor which is somewhat higher than the reboiler temperature and thereby provide for efficient exchange of heat between these two. Such deviation from isothermal operation is within the scope of this invention as claimed.

In an isobaric as in any nonisothermal fractional distillation there is a flow of heat between vapor and liquid in each stage or zone of a distillation column. This flow in an irreversible process is accompanied by an increase in entropy and hence a corresponding loss in efficiency.

The entropy gain in each stage is of course multiplied by the number of stages. As fractional distillation involves a contact of vapors and liquids in each stage, let us define the temperature of the liquid entering as $Te$, the temperature of the vapor entering as $Tg$, and the equilibrium temperature when the two have interacted in the stage as $To$. If we consider the calories of heat from the hotter of the two phases, let us assume that this is the vapor, as $Q$, the net entropy change is given by the following equation:

$$S = Q\left[\frac{1}{Te} - \frac{1}{To}\right] + Q\left[\frac{1}{To} - \frac{1}{Tg}\right]$$

$$= Q\left[\frac{1}{Te} - \frac{1}{Tg}\right]$$

The equation is somewhat simplified as it assumes that the entropy is affected only by the flow of heat and disregarding any other irreversible changes in composition or pressure. as the effects of these other changes are relatively much smaller, the simplification is quite precise for illustrative purposes.

If we compare this with an isothermal distillation for the same stage, $Te=T0Tg$ and the entropy gain, therefore, is zero. To the degree that this condition is approached, the separation is made more efficient from the standpoint of energy utilization. Of course absolutely perfect isothermal operation is not necessary and is not always desirable in practice. A fairly close approximation is, however, achievable, and so there is a very marked gain in efficiency from the standpoint of energy utilization.

In a binary system with a gas and liquid phase there are two degrees of freedom, and under isothermal operation according to the present invention the composition in each change is determined by the pressure of that stage. Of course this assumes that the two phases attain equilibrium in the stage, which, although it is not perfectly reached in a practically useful short time, can be approached sufficiently closely so that the differences are small enough as to be negligible for comparative purposes. As the pressure is increased from stage to stage, the less volatile component is partially condensed from the compressed vapor to the liquid while some of the more volatile component in the liquid is vaporized. The latent heat of condensation is balanced by the latent heat of vaporization, assuming no heat losses or leakage, and so a tower or column operated in accordance with the present invention represents a system which is substantially both isothermal and adiabatic.

Ideally all of the free energy to achieve the partial separation in each stage should be provided by the energy of compression. This is, of course, an ideal which cannot be completely achieved in practice, but a close approximation can be effected, and thus the present invention represents a very substantial improvement in energy utilization over the prior art in which the liquid and vapor react in an isobaric system under highly irreversible conditions, resulting in a large increase in entropy and hence loss in efficiency.

When there are more than two components to be separated, the systems possess of course more than two degrees of freedom, so that the composition of liquid and vapors are not fully determined by specification of temperature and pressure alone as in the case of a binary system. However, if the feed composition, the number of stages, the isothermal separating temperature, the reflux ratio and reboil ratio are specified, the composition of the multicomponent system at each stage is just as truly determined as in a binary system, and the same considerations of minimum increase in entropy hold true for such systems as well.

It has been pointed out above that in a practical distillation sufficient time cannot be given to reach absolutely perfect equilibrium between liquid and vapor in each stage. However, isothermal distillation can advantageously be employed even though there is not a theoretically perfect equilibrium achieved in each stage. The increase in entropy because of the falling somewhat short of the ideal equilibrium is very much less when the interstage compression is used than for isobaric distillation where the stages are at different temperatures, and so the marked improvement is achieved. It should be realized that the present invention deals with a practical process, and while absolutely perfect theoretical results represent an ideal that is not practically attainable, the saving in energy utilization which is achieved by the isothermal operation of the present invention is just as marked and just as real. The difference between a small increase in entropy per stage under isothermal operation and a large increase in entropy under isobaric operations is just as truly an overall gain as if the comparison were between perfect operation of zero entropy increase and a large and finite increase in entropy.

It is an advantage of the present invention that no special design of tower construction is required. Thus the towers may be provided with plates and bubble caps or they may be packed, provided that the stages are separated by a partition. In general, column construction, with the exception of the pressure differences between stages instead of temperature in the isobaric, is not significantly changed by the present invention, except of course that the stages must be partitioned and that the somewhat more perfect separation per stage may make a simpler system which may have fewer stages practical in the present invention in order to effect the same degree of sharpness of separation.

The means for continuously changing pressure from stage to stage will depend on the actual pressure differences between stages, which in turn is determined by the nature of the separation, the requirement for purity of the products, and the other factors, such as reflux and reboil ratios, which are required to achieve the desired results. For any particular operation optimum stage differences can be designed and to some extent computed, and of course the equipment designer will design the equipment in accordance with the separation which is to be achieved. In other words, the present invention permits very marked savings but it does not eliminate the necessity for a skilled designer. The pressure differential between stages and the amounts of flow of vapor required will dictate in every case the particular design of compressing means. Where a large volume is compressed only slightly, in the case of a large number of stages for example, fans are often the most economical compressing means. Where the pressure differences are greater, for example in systems where a smaller number of stages are practical, other types of compressing means, such as blowers and the like, are used. The skilled equipment designer, of course, in every case chooses the best type of pressure changing means for the particular conditions of the particular equipment he is designing. It is, however, an advantage of the present invention that it is very flexible and does not require peculiar or exotic designs of equipment.

In general, a column can be operated only with vapor compressors, and flow of liquid can be by gravity, in the case of vertical columns, augmented of course by the pressure differentials between stages. In a great many equipment designs this is all that is needed. However, for certain purposes a more positive flow of liquid may be desirable and so the present invention is not intended to be limited to systems in which the flow of liquid occurs purely by pressure differentials and/or gravity. Assisted flow by liquid pumps is, therefore, included. It is, however, an advantage of the invention that in many cases it is not necessary to provide a separate or particular liquid flow inducing means.

The present invention should not be confused with isobaric distillations in which there have been proposals for compressing overhead vapors to utilize their latent heat in a reboiler.

It is an advantage of the present invention that a desired degree of separation can often be obtained with a smaller number of stages than would be required in an isobaric distillation. It is made possible because a temperature can be chosen for isothermal distillation at which the volatility ratio is most favorable for effecting the separation.

BRIEF DESCRIPTION OF THE DRAWINGS

The drawings, which are essentially diagrammatic in nature, show a vertical column in FIG. 1.

DESCRIPTION OF THE PREFERRED EMBODIMENTS

Figure 1:
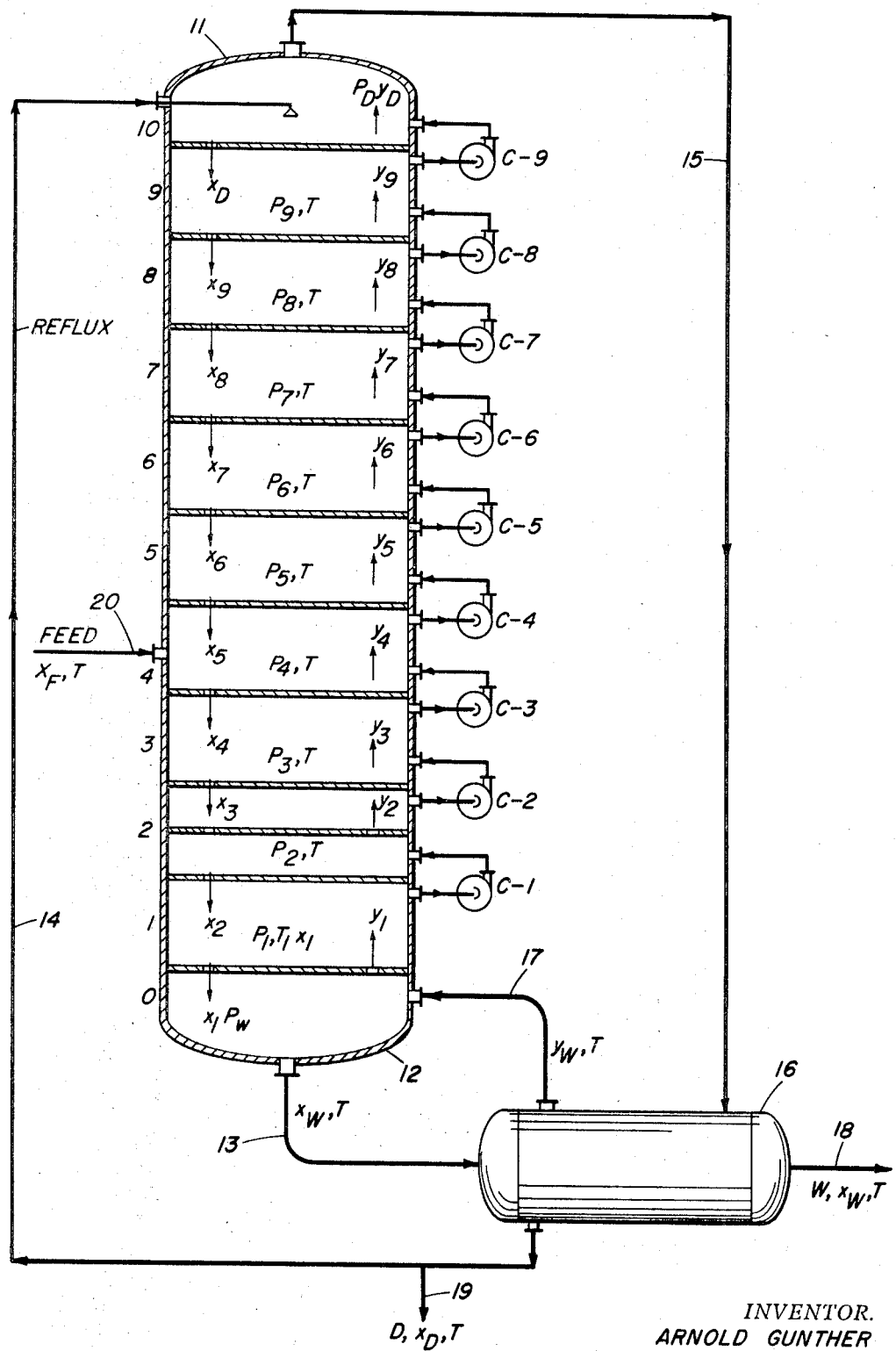

FIG. 1 shows a column at 11 with a bottom 12, a vapor overflow line 15, a high boiling liquid conduit 13, and a reboiler 16. From the reboiler, which receives distillate vapors through the conduit 15, there is a conduit 17 leading to the bottom of the column and permitting reboiling, a reflux conduit 14 leading to a conventional reflux distributor in the top of the column, and outlets for product 18 and 19. Inlet feed comes in through the conduit 20 and is introduced into the column at a point corresponding to a stage where the composition approaches that of the feed composition. This latter is good design in any distillation column.

The column is divided into 11 stages or zones by partition, the stages being numbered 1 to 10, with the bottom 12 of the column constituting an eleventh stage. Nine compressors, numbered C-1 to C-9, are shown diagrammatically and compress vapors from one stage to be introduced into the next stage. In other words, compressor C-1 compresses vapors from stage 1 and introduces the compressed vapors into stage 2, and finally, compressor C-9 compresses vapors from stage 9, introducing it into stage 10 at the top of the column.

Introduction of a binary system is shown with the lower boiling constituent, labeled D. The temperature of isothermal operation is specified as T, and the mol fraction of the constituent X is set out with appropriate subscripts; thus $X_f$ is the mol fraction of X in the feed, and the numbered subscripts in the different stages corresponding to the mol fractions in the particular stages. Y is the mol fraction of the lower boiling component in the vapor phase. The mol fraction for the distillate in the top of the column is labeled $Y_d$, it being noted that the liquid flows from stage 10 down to stage 9 whereas the vapors with the mol fraction $Y_d$ are compressed by the compressor C-9 and passed from stage 9 to the top of the column. Pressures in each stage are given as P for the bottom of the column and $P_1$ to $P_9$ for the numbered stages, the pressure on the distillate being represented by $P_d$.

The proper reboil ratio and reflux ratio is determined for a particular separation and provided for in the conventional manner. The compressed distillate vapors are introduced into the reboiler, which is as customary, and if desired there may become additional compression of the vapors throughout the stages. It should be noted that the pressure P corresponds to the composition desired for the liquid flowing off from this stage, and it may or may not be atmospheric or superatmospheric. For example, for certain operations it is desirable to operate the bottom of a column at a subatmospheric pressure. This is particularly the case where there are columns subdivided into a rectifying and stripping portion, as will be described further below. In every case, however, the pressure increases as the numerical value of the subscript increases.

The two products of distillate and higher boiling constituent in liquid form are removed from the reboiler through conduits 19 and 18 respectively, which are labeled d and w. The mol fraction of X in the two products carries the same subscript, that is to say, $X_d$ and $X_w$. Of course $X_d$ is very small and $X_w$ is large. In order not to complicate the drawing the mol fractions of the other component in the final products are not given.

It will be noted in an isobaric operation the distillate vapors are always at a lower temperature than the material at the bottom of the column. Therefore, when reboiling is desired it is always necessary to compress these vapors before introducing them into a reboiler; whereas under perfect isothermal operation such compression is not needed, although, as has been pointed out above, in some cases some compression may be provided. It will be noted that the vapor compression in the tower operating under isothermal conditions is compression under such conditions, i.e., isothermal; whereas the vapor recompression from the distillate of the isobaric tower is essentially adiabatic. Adiabatic compression requires more energy input than isothermal compression under the same pressure ratio and for the same mass flows and suction temperatures. This results in an additional relative advantage of the isothermal operation.

Another factor of some interest is that in an isobaric tower the large temperature differential between distillate and bottom results in a significant change in volatility of the components along the tower, which makes separation that much more difficult as the bottoms are approached. As a result, a larger number of stages are needed. In the isothermal tower of the present invention the temperature throughout the column is relatively constant and the volatilities of the constituents is therefore also substantially constant, which makes the separation less difficult to achieve and permits in some cases simpler equipment.

Figure 2:
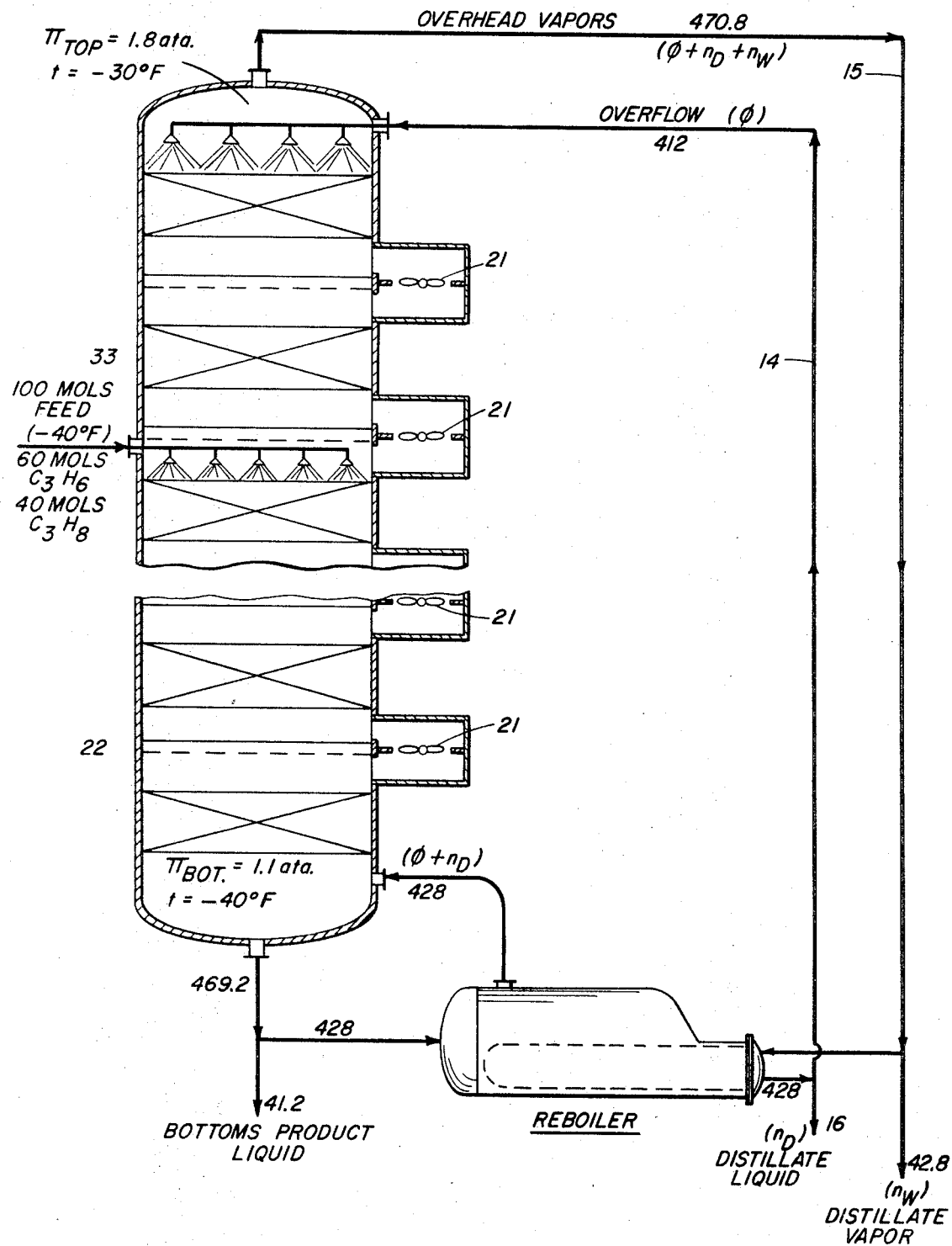
FIG. 2 is a modified vertical column with a different type of vapor compression means.

FIG. 2 represents a practical example of the separation of a mixture of propane and propylene. A feed is shown with 60 mol fractions of the propylene and 40 mol fractions of the propane going into the tower at a suitable point. FIG. 2 also illustrates a tower which has been designated as being in two different zones, the upper part being a rectification portion with 33 stages and the lower 22 stages performing a stripping operation. A different type of compressor between stages is also shown, namely fans (21). In this case, as will appear below, the pressure differentials per stage are quite small, but there is a very substantial volume and for such an operation fans are often the most economical design of vapor compressors. In order to operate a reboiler satisfactorily, a small temperature difference is permitted, the feed coming in at −40° F., which is the temperature at the bottom of the stripping section of the tower; whereas the distillate comes off at −30° F.

It is always necessary in any fractional distillation to decide what the allowable purities of the products are to be. In the practical example represented by FIG. 2 and described in more detail below, it was decided that the propylene distillate should be 99.8 percent pure and that the propane flowing out from the bottom of the stripper section of the column should be 97 percent pure. On a 100 pound mol feed to the tower, which is illustrated, 41.2 pound mols of propane, with 0.03 mol fraction of propylene. Fifty-eight and eight-tenths pound mols of distillate are obtained with 0.002 mol fraction of propane. Reflux ratio was set at 7 and a pressure of 1.1 atmosphere absolute was maintained in the bottom of the stripping section, and 1.8 atmosphere absolute at the top. Conditions in the different stages were chosen to make the pressure differential as uniform as practical in the particular sections of the tower. It is an advantage of the invention that it is not necessary that this be exact, and this gives a desirable flexibility and lack of criticality for operation.

The following table sets out the conditions of the stages in the column, numbering the stages from the top instead of from the bottom as in FIG. 1:

RECTIFYING SECTION

| Stage No. | $t$, °F. | $x$, molecular fraction | $r$, mm. Hg | $\Delta P$, "$H_2O$ |
|---|---|---|---|---|
| 1 | −30 | 0.99727 | 1,349.25 | 5.5 |
| 2 | −30.2 | 0.99639 | 1,339 | 2.8 |
| 3 | −30.3 | 0.00531 | 1,333.75 | 3.1 |
| 4 | −30.7 | 0.99398 | 1,328 | 2.7 |
| 5 | −30.9 | 0.99237 | 1,303 | 3.2 |
| 6 | −31 | 0.99040 | 1,297 | 6.7 |
| 7 | −31.5 | 0.98799 | 1,284.5 | 7.1 |
| 8 | −32 | 0.98505 | 1,271.25 | 7.1 |
| 9 | −32.5 | 0.98174 | 1,258 | 7.3 |
| 10 | −33 | 0.97114 | 1,244.3 | 8.7 |
| 11 | −33.5 | 0.97189 | 1,228 | 6.2 |
| 12 | −34 | 0.96555 | 1,216.2 | 8.9 |
| 13 | −34.5 | 0.95791 | 1,199.5 | 6.6 |
| 14 | −35 | 0.94878 | 1,187.2 | 8.4 |
| 15 | −35.5 | 0.93789 | 1,171.5 | 8.1 |
| 16 | −36 | 0.92499 | 1,156.25 | 9 |
| 17 | −36.5 | 0.90984 | 1,139.5 | 8.8 |
| 18 | −37 | 0.89216 | 1,122.9 | 9.2 |
| 19 | −37.5 | 0.87182 | 1,105.7 | 8.4 |
| 20 | −38 | 0.84861 | 1,087.9 | 10.3 |
| 21 | −38.5 | 0.8225 | 1,068.5 | 10 |
| 22 | −39 | 0.79357 | 1,049.5 | 11.6 |
| 23 | −39.5 | 0.76204 | 1,027.8 | 11.6 |
| 24 | −40 | 0.72829 | 1,006.1 | 4.4 |
| 25 | −40 | 0.69285 | 997.8 | 1.6 |
| 26 | −40 | 0.6800 | 994.8 | 2 |
| 27 | −40 | 0.664 | 991 | 1.7 |
| 28 | −40 | 0.651 | 987.9 | 1.6 |
| 29 | −40 | 0.638 | 984.9 | 1.7 |
| 30 | −40 | 0.625 | 981.8 | 1.6 |
| 31 | −40 | 0.612 | 978.8 | 1.5 |
| 32 | −40 | 0.6 | 976 | |

STRIPPING SECTION AT −40° F.

| Stage No. | $t$, °F. | $x$, molecular fraction | $r$, mm. Hg | $\Delta P$, "$H_2O$ |
|---|---|---|---|---|
| 33 | −40 | 0.6 | 976 | |
| 34 | −40 | 0.565 | 970.6 | 2.9 |
| 35 | −40 | 0.54 | 964.6 | 3.2 |
| 36 | −40 | 0.515 | 958.6 | 3.2 |
| 37 | −40 | 0.485 | 951.4 | 3.9 |
| 38 | −40 | 0.453 | 943.72 | 4.1 |
| 39 | −40 | 0.417 | 935.08 | 4.6 |
| 40 | −40 | 0.38 | 926.2 | 4.9 |
| 41 | −40 | 0.34 | 916.6 | 5.2 |
| 42 | −40 | 0.305 | 908.2 | 4.5 |
| 43 | −40 | 0.268 | 899.32 | 4.8 |
| 44 | −40 | 0.23 | 890.2 | 4.9 |
| 45 | −40 | 0.20 | 883 | 3.9 |
| 46 | −40 | 0.17 | 875.8 | 3.9 |
| 47 | −40 | 0.142 | 869.08 | 3.6 |
| 48 | −40 | 0.12 | 863.8 | 2.9 |
| 49 | −40 | 0.1 | 859 | 2.6 |
| 50 | −40 | 0.08 | 854.2 | 2.6 |
| 51 | −40 | 0.067 | 851.08 | 1.7 |
| 52 | −40 | 0.056 | 848.44 | 1.4 |
| 53 | −40 | 0.045 | 845.8 | 1.4 |
| 54 | −40 | 0.036 | 843.64 | 1.2 |
| 55 | −40 | 0.03 | 842.2 | 0.75 |

Summing up for this example, we have—
In:
  Feed, 100 mols at −40° F.
  Compression work, 42.8# mols vapor × 8,150 $\frac{B.t.u.}{\#mol}$ = 348,000 B.t.u.
  (at 50% efficiency)

where 8,150 $\frac{B.t.u.}{\#mol}$ is the averaged latent heat of vaporization for the vapors.

Out:
  Products:
    97% $C_3H_8$, 41.2 mols at −40° F. (liquid).
    99.8% $C_3H_6$, 16 mols at −30° F. (liquid).
    99.8% $C_3H_6$, 42.8 mols at −30° F. (sat. vapor).

In the above example, the heats of mixing for the feed components are negligible, and that is why practically all of the energy of compression appears as latent heat in the products that are not condensed. The compressors in this particular example are of the propeller type, because they are suitable for small pressure rises and relatively large flows.

Figure 3:
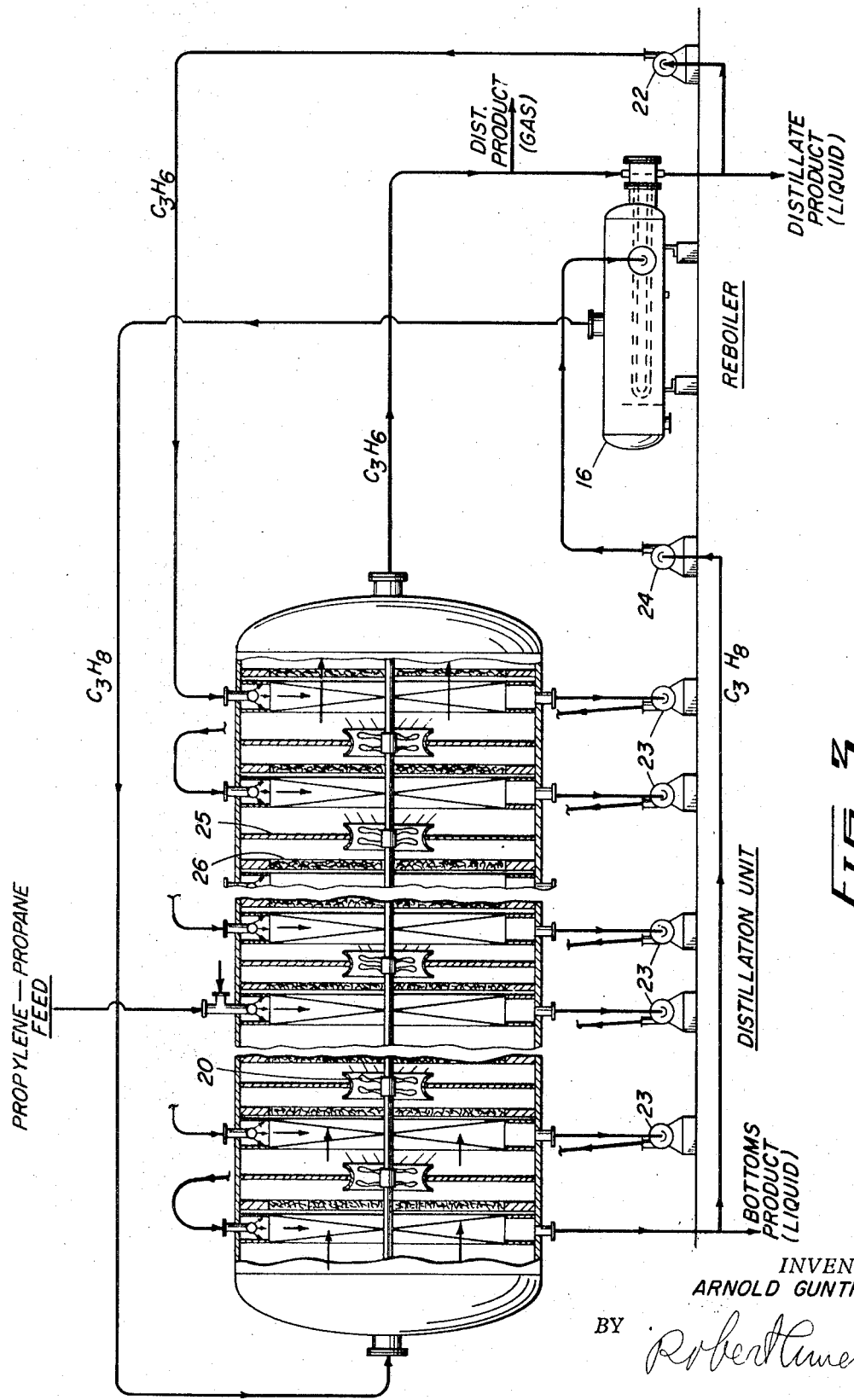
FIG. 3 is a horizontal column.

FIG. 3 illustrates a horizontal column, the same parts corresponding to those in the other FIGS. being given the same reference numerals. However, there are some additional elements; for example the reflux is transferred up with liquid stage transfer pumps. Two of these are shown at 23. There is also a propylene pump 22 which refluxes condensed propylene as shown. Finally, there is a propane pump 24 which transfers a portion of the propane product from the left-hand side of the column into the reboiler 16. It will be noted that the left-hand portion corresponds to the bottoms of FIGS. 1 and 2. The fans 20 are axial and stages are internally separated by diaphragms 25. The tower is provided with packing and some special demisting packing at 26.

In the operation of FIGS. 1 to 3 the molal ratio of liquid flow rate to that of vapor was close to 1. However, the invention is also applicable to separations where the ratio is not unity, for example where the molal liquid flow is greater than the molal gas flow.

Figure 4:
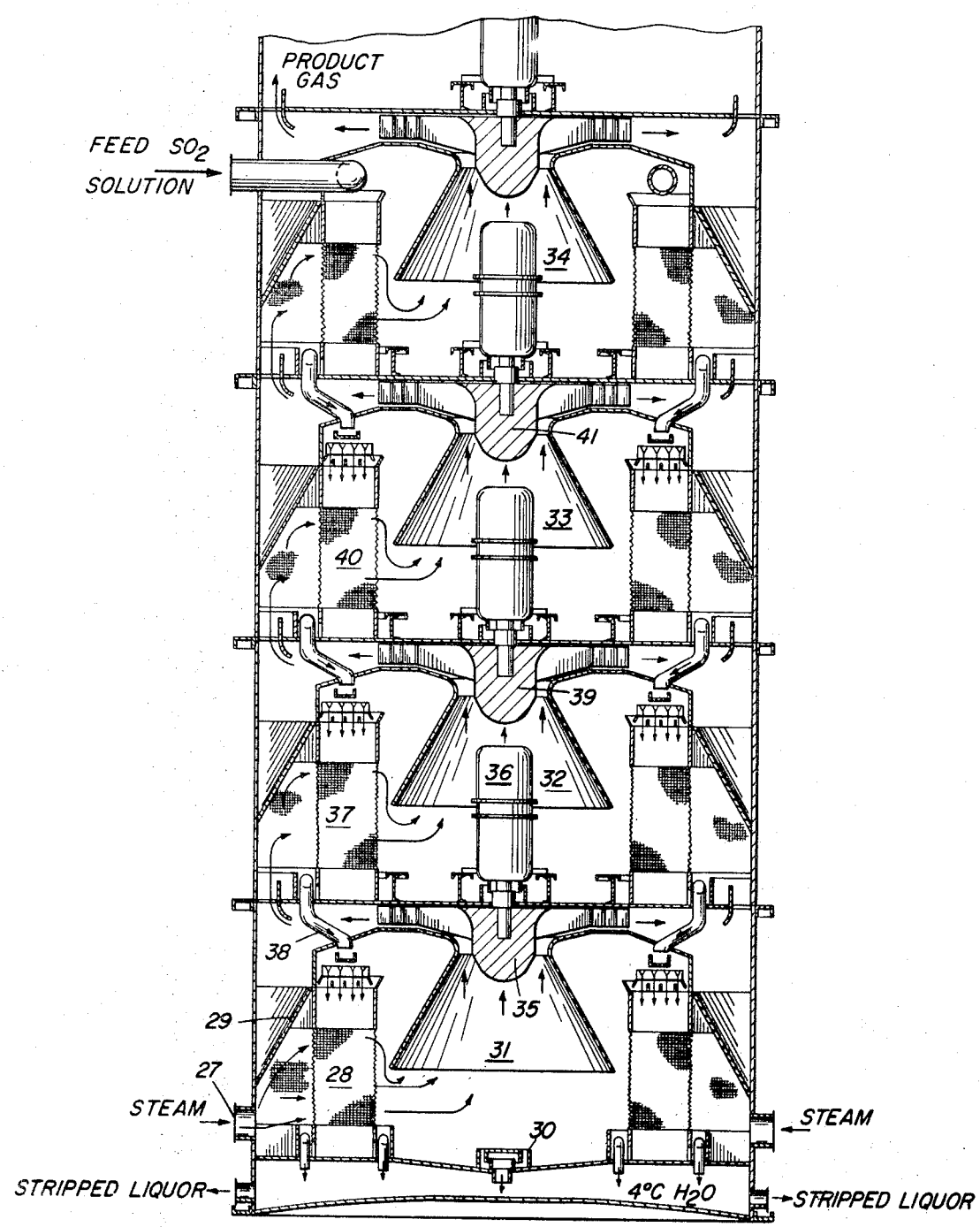
FIG. 4 is a diagrammatic representation of a particular piece of equipment for producing concentrated $SO_2$ gases from very dilute aqueous solutions.

FIG. 4 illustrates the situation where the present invention is utilized to recover $SO_2$ from effluent from a high-pressure sulfuric acid plant. The effluent gas at 8 atm. contained 5.25 percent $SO_2$. This gas was cleaned by water scrubbing and cooled to 86° F. The cooled gas was then absorbed in water in a packed tower to remove 99 percent of the sulfur dioxide and produce a water solution containing 0.006 mol fraction of $SO_2$. This solution was then processed in accordance with this invention in a packed stripping tower consisting of four sections. The packed sections contained 300 ft.³ of 2 inches polypropylene Pall Rings each. The sections are generally numbered 31, 32 and 33, and the packed towers are in cylindrical form.

Stripping steam enters at 27 and passes horizontally through the cylindrical packed towers 28 of section 31. The inclined baffle 29 causes the incoming steam to distribute itself along the periphery and then through the cylindrical towers into the center, as shown by the arrows. Water drainage is through suitable seals 30. The stripping steam was introduced at the rate of 4,500 pounds/hr. for a feed solution rate of 114,000 gals./hr. A centrifugal compressor 35 picks up the steam and compresses it from 34 mm. of mercury to 50 mm. of mercury. This steam contains about 6 percent of $SO_2$ by volume. The compressor 35, as is the case with the interstage compressors for the other sections, which will be described below, is driven by hydraulic drive, which is shown at 36 in purely diagrammatic form. The drives for the other stage compressors are similarly shown on the drawings but are not separately numbered.

The flow of the steam and $SO_2$ is through cylindrical packed towers of the second section 37 in the same manner as the flow in the first section. Water containing a small amount of $SO_2$ drains through the pipe 38 into the packed towers 28 of the first section. After passing through the towers 37 the vapors have a composition of about 37 percent $SO_2$ and 63 percent $H_2O$ by volume. These vapors are then compressed by a compressor 39 in the same manner as the compression took place from section 31 to section 32. The pressure is increased to 140 mm. and it enters section 33, passing through the cylindrical tower 40, as shown by the arrow. After passing through this tower the composition was of a gas containing 78 percent $SO_2$, which was then compressed by the compressor 41 to 256 mm. and passed through the cylindrical tower 42 of section 34. On leaving this tower the concentration of $SO_2$ was about 87 percent, which is sufficiently concentrated for use in a sulfuric acid plant.

The temperature, as indicated above, for the isothermal operation was 40° F. and the power and steam consumption were as follows: Compressor 35 required 90 HP, compressor 39 300 HP, Compressor 42 180 HP, for a total of 570 HP. This produced a gas containing 323 pound mols per hour of $SO_2$ with 49 pound mols of water vapor. The injection steam rate was 250 pound mols per hour. By way of comparison, 4,000 pound mols per hour of steam would have been consumed in conventional isobaric stripping.

If the cost of steam is $0.50/1,000 lbs. and electrical energy costs $0.01/kw.-hr., the cost of power and steam is $7 per hour for the isothermal stripping compared with $36/hr. for the steam in isobaric stripping.

It will be noted that the isothermal concentration cost less than one-fifth as much as a corresponding isobaric system.

I claim:

1. A process of separating materials of differing volatilities comprising a multizonal separation operating on a substantially isothermal basis which comprises compressing vapors from each zone to a pressure at which their boiling point temperature is substantially the same as the temperature in the zone from which the vapors came, introducing the compressed vapors into the next zone, whereby partial condensation of the compressed vapors occur under substantially isothermal conditions resulting in minimum entropy increase.

2. A process according to claim 1 in which liquids and gaseous components are caused to flow countercurrently from zone to zone.

3. A process according to claim 1 in which a dilute solution of $SO_2$ in water is transformed into a liquid water product and a concentrated gaseous $SO_2$ product.

4. A process according to claim 1 in which the mixture to be separated is a mixture of hydrocarbons of different volatility.

5. A process according to claim 2 in which the mixture to be separated is a mixture of hydrocarbons of different volatility.